(12) United States Patent
Droba et al.

(10) Patent No.: US 7,437,200 B2
(45) Date of Patent: Oct. 14, 2008

(54) SOFTWARE BASED CONTROL SYSTEM FOR NUCLEAR REACTOR STANDBY LIQUID CONTROL (SLC) LOGIC PROCESSOR

(75) Inventors: Gregory Scott Droba, San Jose, CA (US); Stanley Anthony Frederick, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 236 days.

(21) Appl. No.: 10/872,205

(22) Filed: Jun. 18, 2004

(65) Prior Publication Data
US 2005/0281368 A1      Dec. 22, 2005

(51) Int. Cl.
*G05B 11/01*      (2006.01)
*G05B 9/02*      (2006.01)
*G21C 17/00*      (2006.01)

(52) U.S. Cl. .............................. 700/21; 700/79; 700/81; 700/292; 376/259

(58) Field of Classification Search ................. 376/259, 376/215–217, 245; 700/21, 22, 292, 79–81
See application file for complete search history.

(56) References Cited

U.S. PATENT DOCUMENTS

| | | | |
|---|---|---|---|
| 4,517,154 A | * | 5/1985 | Dennis et al. ............... 376/259 |
| 4,574,068 A | * | 3/1986 | Hill et al. .................... 376/259 |
| 4,584,165 A | | 4/1986 | Wilson et al. |
| 4,957,690 A | | 9/1990 | Fennem |

OTHER PUBLICATIONS http://en.wikipedia.org/wiki/Lookup_table.*

* cited by examiner

*Primary Examiner*—Ryan A Jarrett
(74) *Attorney, Agent, or Firm*—Armstrong Teasdale LLP (57) ABSTRACT

A method and system is provided for a nuclear reactor safety related application. The method includes executing two forms of a same application-specific logic, one of the two forms implemented as hardware logic, and the other of the two forms implemented as software instructions for execution by microprocessor-based controlling software. Each form of the application-specific logic is executed with a same set of inputs. The method compares a result produced from the execution of the hardware-implemented form to a result produced from the execution of the software-implemented form. When the compared results concur, the controlling software performs actions associated with the concurring results by executing microprocessor-based software. When the compared results fail to concur, the controlling software reports the failure of the compared results to concur to an operator by executing microprocessor-based software, and thereafter places the microprocessor-based software system into an inoperative (INOP) mode.

21 Claims, 5 Drawing Sheets

SOFTWARE BASED CONTROL SYSTEM FOR NUCLEAR REACTOR STANDBY LIQUID CONTROL (SLC) LOGIC PROCESSOR

BACKGROUND OF THE INVENTION

This invention relates generally to nuclear reactor safety systems and more particularly, to systems and methods for Standby Liquid Control (SLC).

A SLC system of a nuclear reactor injects a liquid, e.g. a boron solution, into the reactor vessel when commanded by the nuclear reactor systems or by an operator of the nuclear reactor. The injection process is sufficient to bring the reactor from full power to a sub-critical condition without control rod movement.

Nuclear reactor systems (herein, nuclear reactor and reactor are used synonymously) require periodic surveillance be done to make sure the reactor systems are operating correctly. However, surveillance procedures for analog SLC systems (herein, SLC system, SLC instrument, and SLC Logic Processor and SLC are used synonymously) require reactor personnel to manually actuate the SLC system in order to test the system and obtain reports on the operability of the SLC equipment. Automation of the manual surveillance functions for analog SLCs is not easily achieved.

Although analog SLC systems provide a very important reactor safety-related function, more may be done to provide an improved SLC system.

BRIEF DESCRIPTION OF THE INVENTION

A method and system is provided for a nuclear reactor safety related application. The method includes executing two forms of a same application-specific logic, one of the two forms implemented as hardware logic, and the other of the two forms implemented as software instructions for execution by microprocessor-based controlling software. Each form of the application-specific logic is executed with a same set of inputs. The method compares a result produced from the execution of the hardware-implemented form to a result produced from the execution of the software-implemented form. When the compared results concur, the controlling software performs actions associated with the concurring results by executing microprocessor-based software. When the compared results fail to concur, the controlling software reports the failure of the compared results to concur to an operator by executing microprocessor-based software, and thereafter places the microprocessor-based software system into an inoperative (INOP) mode.

A digital microprocessor-based system is provided for a nuclear reactor safety related application. Included in the system is a microprocessor with memory, hardware, circuitry, and software programming that provides for execution of two forms of a same application-specific logic, and provides for the two forms to be executed with a same set of inputs. The same application-specific logic is implemented in one form as hardware logic, e.g. within a programmable logic device (PLD). The other of the two forms of the application-specific logic is implemented as software instructions for execution by the microprocessor, e.g. a set of software instructions stored within EPROM memory of the microprocessor-based system. The software programming further provides for comparison of a result produced from execution of the one form of the application-specific logic as hardware logic to a result produced from execution of the other form of the application-specific logic as software instructions. When the compared results concur, the software programming provides for the execution of actions associated with the concurring results. When the compared results fail to concur, the software programming provides for the reporting to an operator of the failure of the compared results to concur, thereafter the software programming executing to place the microprocessor-based system into an inoperative (INOP) mode.

DETAILED DESCRIPTION OF THE INVENTION

In an embodiment of the invention, a digital microprocessor-based SLC Logic Processor injects a boron liquid solution into the reactor when commanded by Anticipated Transient Without SCRAM (ATWS) logic units or by an operator (e.g., by key-switch). For example, the SLC initiates the injection process when commanded by at least two out of four ATWS logic units.

Figure 1:
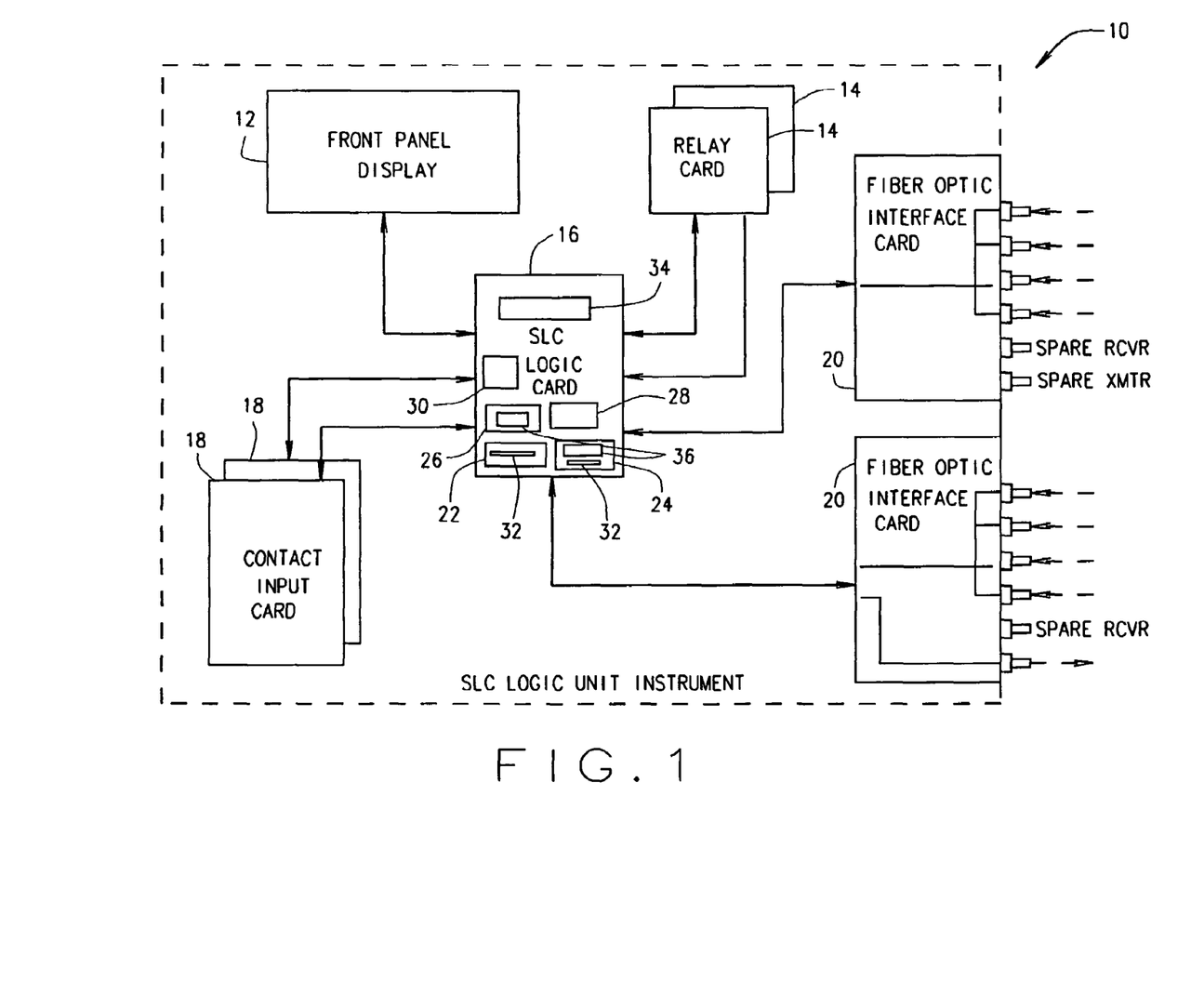
FIG. 1 is a bock diagram exemplifying an embodiment of a SLC logic unit.

FIG. 1 is a block diagram exemplifying an embodiment of a digital microprocessor-based SLC logic unit 10. SLC logic unit 10 includes a SLC logic card 16, at least one contact input card 18 (two shown in FIG. 1) connected to SLC logic card 16, at least one relay card 14 (two shown in FIG. 1) connected to SLC logic card 16, at least one optical card 20 (two shown in FIG. 1) connected to SLC logic card 16, and a front panel display 12 connected to SLC logic card 16.

SLC logic card 16 performs logic processing and communication functions for the SLC instrument and associated peripheral cards. SLC logic card 16 communicates with the operator via a main control room (MCR) and MCR panel (MCRP) (not shown in FIG. 1), and with external systems (not shown in FIG. 1), and includes the following functionality. SLC logic card 16 includes a microprocessor 34 which executes a microprocessor operating system that executes SLC application logic. In one embodiment, SLC logic card 16 includes complex programmable logic devices (complex PLDs, or just CPLDs, PLD and CPLD being used interchangeably herein). For example, control CPLD 22 for control and decoding and application and CPLD 24 for SLC injection logic are provided. In an exemplary embodiment, SLC logic card 16 includes EPROM memory 26 for non-volatile program storage, RAM memory 28 for read/write memory needs, and non-volatile RAM 30 (NVRAM 30) for storage of application parameters that cannot be lost when power is removed. Such NVRAM parameters might include self-test error codes and counts, a cold boot counter, a warm boot counter, a watchdog timer, and power supply voltage/current settings (if any). EPROM memory 26 and CPLD 24 also include a same application-specific logic, namely SLC injection logic 36. Each of CPLDs 22 and 24 include a status/results register 32. SLC logic card 16 receives Analog Trip Module (ATM) and tank level sensor inputs and performs logic processing to confirm the sensors operating correctly.

SLC logic card 16 uses the inputs to halt the injection process upon a low level indication of boron fluid. The automatic testing and detection of ATM tank level sensors exemplify ability of the SLC instrument to automate surveillance of external equipment and report results to the operator while the plant is on or off line.

Contact input card 18 provides for MCRP of Local Panel switch (e.g. key-switch) and Low Voltage Switchgear (LSWG) signal inputs to the SLC logic card 16, for example to control CPLD 22. Each contact input card 18 excites the external contacts which are connected to contact input card 18 and electrically isolates and translates the contact status to SLC logic card 16.

Relay card 14 provides control of relay outputs, for example, outputs to injection pumps, injection valves, storage tank valves, and overload bypass control. The relays latch to maintain output control if power is removed from the SLC instrument. Two relay cards 14 are used in series, requiring that both card A and card B (of relay cards 14) energize to control a specific output, thus providing protection against accidental and unwanted injection.

Optical card 20 provides conversion between optical and electrical signals. Each optical card 20 receives and transmits to external hardware. For example, optical card 20 receives ATWS injection activation and bypass inputs. Optical card 20 communicates messages to the main control room (MCR) operator.

Front panel display 12 provides for a single line display of alphanumeric characters. Front panel display 12 uses steady state LED based technology which is stable and has no flicker. Information that is displayed by front panel display 12 includes system status and mode information, as well as results of self tests.

SLC logic card 16 provides for self-test and on-line diagnostics capabilities that allow the operator to identify and isolate failures to replaceable hardware modules, including relay card 14, contact input card 18, power supplies (not shown in FIG. 1), analog trip modules (ATMs) (not shown in FIG. 1), and SLC logic card 16 itself. SLC logic card 16 also contains frequency detector circuitry. The frequency detector monitors an optical input link for one of 3 conditions: a) Active state (used by SLC as a Trip or Bypass command), when a particular optical pulse train frequency is detected (1 Mhz in the logic of one example). b) Inactive state (Not Tripped or Not Bypassed command), which is half the frequency of the active state (500 Khz in the logic of one example). C) Fault state, when no valid Active or Inactive state is detected. The self test logic simulates each of the 3 input conditions and monitors the frequency detector output for a response.

Control CPLD 22 provides for system monitoring, read/write one of the two relay card 14, and memory decoding. Control CPLD 22 latches and reads relay card 14 status, reads operator pushbutton and switch (e.g. key-switch) position inputs to contact input card 18, and processes contacts status and bypass and ATWS control inputs received via optical card 20. In one embodiment, control CPLD 22 additionally provides to SLC logic card 16 decoding and latching control for the latching relay driver registers of relay card 14, decoding for LED registers of front panel display 12, control to contact input registers for self testing of contact input card 18, and control for self testing the bypass and ATWS input logic.

CPLD 24 provides system monitoring, read/write of the other of the two relay card 14 (the first being controlled by CPLD 22), injection logic status registers, local decoding, and SLC injection logic 36. CPLD 24 contains logic control for pump motors, injection valves, storage tank outlet valves, as well as SLC status monitoring, e.g. overload bypass status monitoring, which may be operated to initiate or halt the injection of boron liquid into the reactor. CPLD 24 provides CPLD 24 status registers and relay card driver control for series relays (which provides protection against accidental and unwanted injection).

Status/results registers of a CPLD provide results of execution of CPLD logic. Results in the CPLD status/results registers are compared to results obtained by executing same CPLD logic as software to determine concurrence between the hardware-implemented CPLD logic and the software implementation of the CPLD logic. Such comparison for concurrence provides a check for correct operation of both hardware and software. For example, status/results registers 32 provide the results of executing hardware-implemented SLC injection logic 36 on CPLD 24 and are compared to the results generated from executing the same SLC injection logic 36 as software on SLC logic card 16. Same hardware status inputs, e.g. trip data from Anticipated Transient Without SCRAM (ATWS) logic processors, are used for execution of the software-implemented SLC injection logic 36 as for execution of the hardware-implemented (CPLD) SLC injection logic 36. Only when the results concur between execution of software-implemented and hardware-implemented SLC injection logic 36 is the injection process initiated by SLC logic unit 10. When the results do not concur, a CPLD error is flagged, displayed and reported to the operator. A non-concurrence in addition makes the SLC instrument inoperative, e.g. changing the SLC instrument execution mode to an INOP mode.

As noted, the injection process is initiated via a concurrence of votes between execution of software-implemented SLC injection logic 36 and hardware-implemented (CPLD) SLC injection logic 36. Additionally, an external signal is provided to the SLC logic card 16 via an input contact (card 18) to notify microprocessor 34 when the operator manually turns a key at the master control room panel (MCRP) (not shown in FIG. 1) signifying a manual command by the operator to initiate the injection process.

In discussing the data flow and execution flow of SLC software 38 (to be discussed in the description of FIG. 5), SLC logic unit 10, and thus SLC software 38, has a plurality of operating modes within which SLC software 38 is executed. For example, in one embodiment, modes within which SLC software 38 executes include operating modes controlled by a front panel key-lock switch and a spring loaded key-lock switch either on the Main Control Room Panel (MCRP) or the Local LSWG Panel. The SLC logic card 16 senses key switch positions via the input contact card 18.

In the one embodiment, four positions exist on the SLC Logic Processor front panel:
1. NORMAL,
2. INOP/SELFTEST,
3. PRE-OP OVERLD BYPASS TEST, and
4. OVERLOAD BYPASS TEST These sub-modes are hereafter called the NORMAL, INOP, PRE-OP and BYPASS TEST positions.

Figure 2:
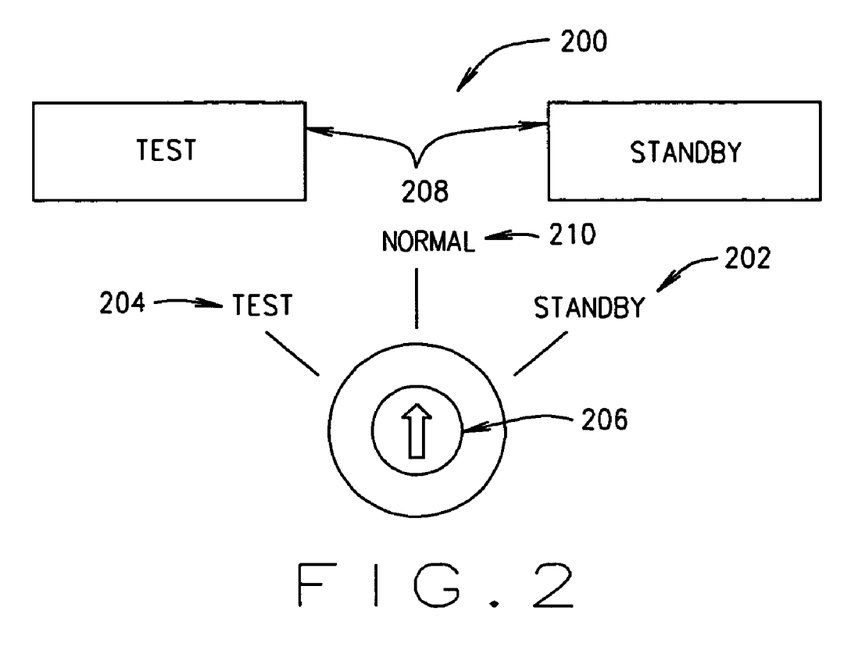
FIG. 2 is a diagram illustrating a control panel switch of an embodiment of a SLC logic unit.

As shown in FIG. 2, two positions exist for MCRP/Local Panel mode switch 200: position 202, STANDBY, and position 204, and TEST. FIG. 2 shows the MCRP key switch 206 and indicator lamps 208 for mode selection. On the MCRP, position 210, NORMAL, is the return seat of the spring loaded switch, not a mode.

In the exemplary embodiment, STANDBY and TEST are considered the primary modes, while NORMAL, INOP, PRE-OP, and BYPASS TEST are considered as sub-modes.

Since the focus is on the SLC Logic Processor, and not the Local Panel or Control Room, the emphasis is on the modes controlled at that SLC front panel, with information pertaining to differences of operation with respect to STANDBY and TEST where required.

Figure 3:
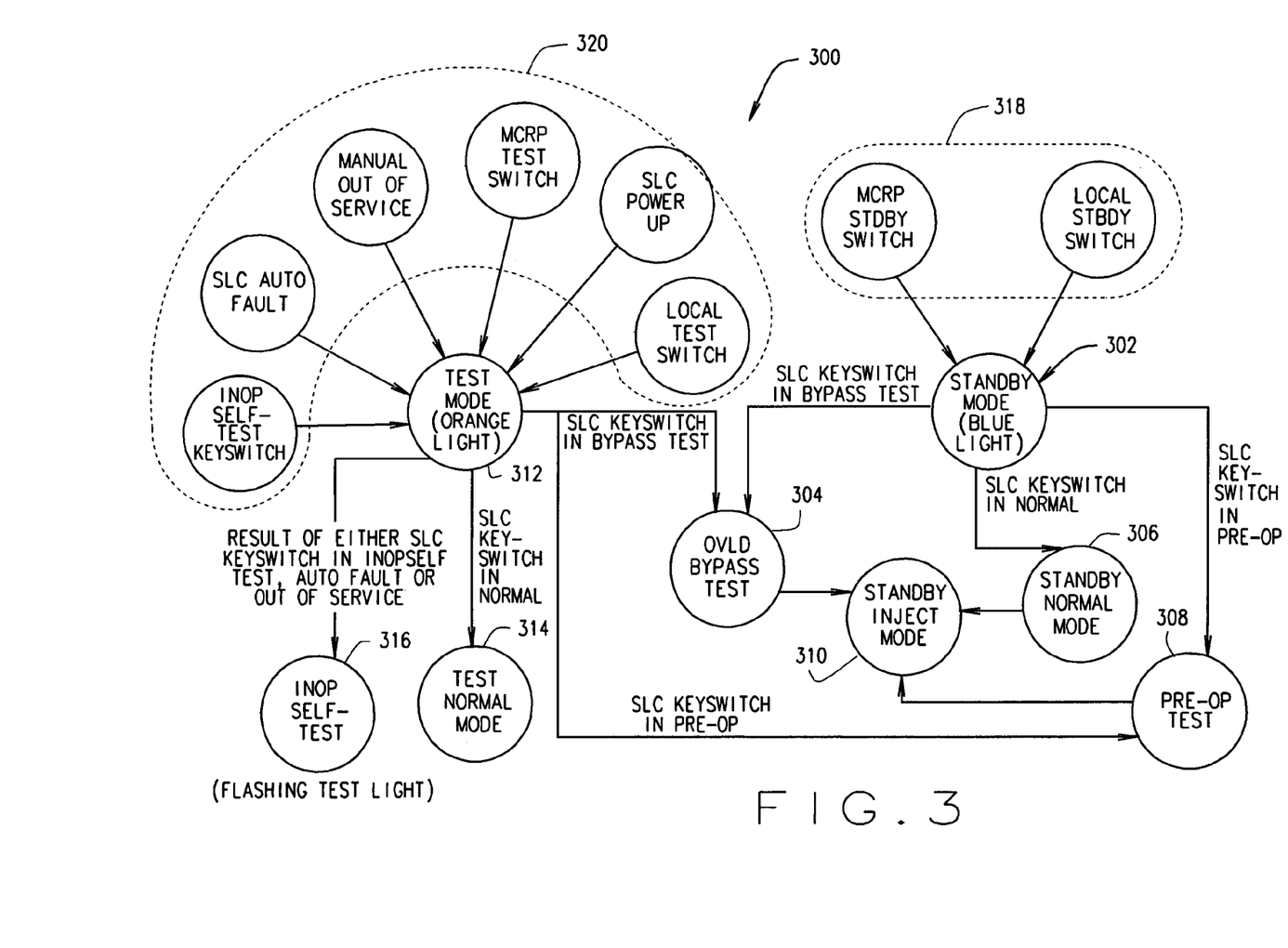
FIG. 3 illustrates SLC modes/sub-modes in accordance with an embodiment of the invention.

The combination of the four position key switch on the SLC Logic Processor and the two positions of the MCRP and Local Panel make the following modes:
Standby/Normal
Standby/Pre-Op
Standby/Bypass Test
Standby/Normal-Inject
Standby/Pre-Op-Inject
Standby/Bypass Test-Inject
Test/Normal
Test/Pre-Op
Test/Bypass Test
Test/INOP
Test/Normal-INOP
Test/Pre-Op-INOP
Test/Bypass Test-INOP FIG. 3 illustrates the modes/sub-modes 300 of an exemplary embodiment of a SLC Logic Processor and the inputs contributing to transitioning to a given mode/sub-mode. Shown in FIG. 3 are the primary modes standby mode 302 and test mode 312. Inputs 318 contribute to transitioning to the standby mode 302 and inputs 320 contribute to transitioning to test mode 312. As shown in FIG. 3, various sub-modes of standby mode 302 and test mode 312 are attained via the actions listed on the connecting arrows of FIG. 3. Standby mode 302 has the sub-modes NORMAL mode 306, PRE-OP mode 308, BYPASS TEST mode 304, with each of these sub-modes 304, 306, and 308 potentially being in an INJECT sub-mode 310. Test mode 312 has the sub-modes NORMAL mode 314, INOP mode 316, PRE-OP mode 308, and BYPASS TEST mode 304, with each of the sub-modes 304, 308 and 314 potentially being in an INOP sub-mode.

While the SLC Logic Processor key-switch is in the INOP position, however, all key switch input from the MCRP or Local Panel is disregarded and the main instrument mode remains in TEST. All modes are selectable by the operator, however, automatic out-of-service, ATWS Initiation Trips, or self-test faults can cause the following sub-modes to be entered:
INJECT
INOP When the SLC logic unit 10 is in the NORMAL, PRE-OP or BYPASS TEST sub-mode (e.g. keyswitch position), the instrument can be placed into both STANDBY mode or TEST mode from both locations (Local Panel and MCRP). STANDBY/NORMAL mode is the normal operating mode for SLC software 38. In all modes but the INOP sub-modes, SLC software 38 sets LED indicators on front panel display 12, e.g. displaying status information and messages via the LEDs, runs background self tests, and sends self test results and status messages to the operator. Background self tests include all SLC hardware tests excepting tests as outlined in the rest of the operator-selectable modes. Background self tests include memory testing (NVRAM, EPROM & RAM), watch-dog timer counter incrementing, power supply tests, A/D converter testing, CPU, PLD, ATM Sensors and Display Self Test Status. Operator selection of a self-test pushbutton has no function except in the INOP sub-modes. Limited test results are displayed on front panel display 12 and are sent as messages to the operator over communication module interface (CIM) communications links. No background tests are performed on relay cards 14 or input contact cards 18 or any equipment connected to them while not in INOP sub-mode.

INOP/SELF-TEST mode is an off-line mode of the SLC instrument during which the injection process must not be initiated. If in progress when switching to INOP mode, the injection process will be halted. A change to INOP mode may occur when finding a critical fault during back ground self-testing. Also, INOP/SELF-TEST mode (technically called one of Test/Normal-INOP, Test/Pre-Op-INOP, Test/Bypass Test-INOP) is selected from the main control room panel (MCRP) by placing the pump into a tagout condition and causes simultaneously 'INOP' and 'TEST' mode states to be true for execution of SLC software 38. Background self tests are suspended when in INOP mode, and are activated through a self-test pushbutton, which when depressed, causes the execution of the background self tests and additional tests. The additional tests include a) control and testing of relay contact interface logic, b) control and testing of specific latch relays on the outputs, c) simulating inputs for an injection mode and validating the responses of the CPLD, d) executing communications loop back tests, e) frequency detector (located on SLC Logic card 16 to convert ATWS inputs from Fiber Optic Interface Card 20 self test, f) watch dog time-out test, g) single line display hardware test. The additional tests exemplify the ability of the SLC instrument to isolate contacts and simulate inputs [item c) above], as well as isolate and control output relays for testing purposes [items a) and b) above]. As stated, inputs are simulated for initiating the injection process with the CPLD results being validated [items c and e]. Input contact card 18 inputs are also isolated and tested by SLC software 38 without causing actual events or state changes to occur. As stated, control and testing of specific latch relays on outputs as well as of relay contact interface logic provides for isolation of and testing of outputs to external equipment. Test results are displayed on front panel display 12 and are sent as messages to the operator over communications links. All equipment controlled by the SLC Logic Processor (e.g. pump start/stop, MBV-0001 open/close, MBV-0005 open/close, MBV-0001 bypass, MBV-0005 bypass) employ two series relays. When testing, one relay is isolated and latched open permitting testing of the other by latching the other closed and open. In similar fashion, each relay may be tested without energizing the equipment controlled by the relay. All SLC logic is isolated via an override logic located in input contact card 18 to permit testing of each contact input.

The operator selects a PRE-OP TEST mode from the front panel of the SLC Logic Processor, the PRE-OP TEST mode being a sub-mode of the STANDBY and TEST modes. This mode causes disabling of the overload bypass relay function to allow manual testing of valves with overload protection enabled. When in PRE-OP TEST mode as a sub-mode of STANDBY mode, SLC software 38 remains in STANDBY mode and is prepared to enter INJECT mode if necessary. When in PRE-OP TEST mode as a sub-mode of TEST mode, SLC software 38 remains in TEST mode and is not prepared to enter INJECT mode. Test results may be displayed on front panel display 12 and are sent as messages to the operator over communications links via fiber optic card 20.

The operator selects the BYPASS TEST mode from the front panel of the SLC Logic Processor, the BYPASS TEST mode being a sub-mode of the STANDBY and TEST modes. When in the BYPASS TEST mode, SLC software 38 automatically executes tests that check the capability to energize and detect an overload bypass control solenoid for the relays for the valves mentioned in PRE-OP TEST mode above. When in BYPASS TEST mode as a sub-mode of STANDBY mode, SLC software 38 remains in STANDBY mode and is prepared to enter INJECT mode if necessary. Selecting BYPASS TEST mode as a sub-mode of STANDBY mode exemplifies the ability of the SLC instrument to actuate external equipment (in this case, energize and detect an overload bypass control solenoid for relays which operate valves) for testing purposes while the plant is on or off line. When in BYPASS TEST mode as a sub-mode of TEST mode, SLC software 38 remains in TEST mode and is not prepared to enter INJECT mode. Test results are displayed on front panel display 12 and are sent as messages to the operator over communications links via fiber optic card 20.

The INJECT mode is entered automatically in the event of receiving an ATWS trip signal or a pump start key-switch from the MCRP, the INJECT mode being a sub-mode of the NORAML, PRE-OP, and BYPASS TEST modes (while these are also considered sub-modes to STANDBY and TEST, the SLC Logic Processor must be in STANDBY mode). After injection is completed, the system automatically returns to the STANDBY mode. In one embodiment, the INJECT mode is entered by the operator manually turning a key at the main control room panel (MCRP).

Figure 4:
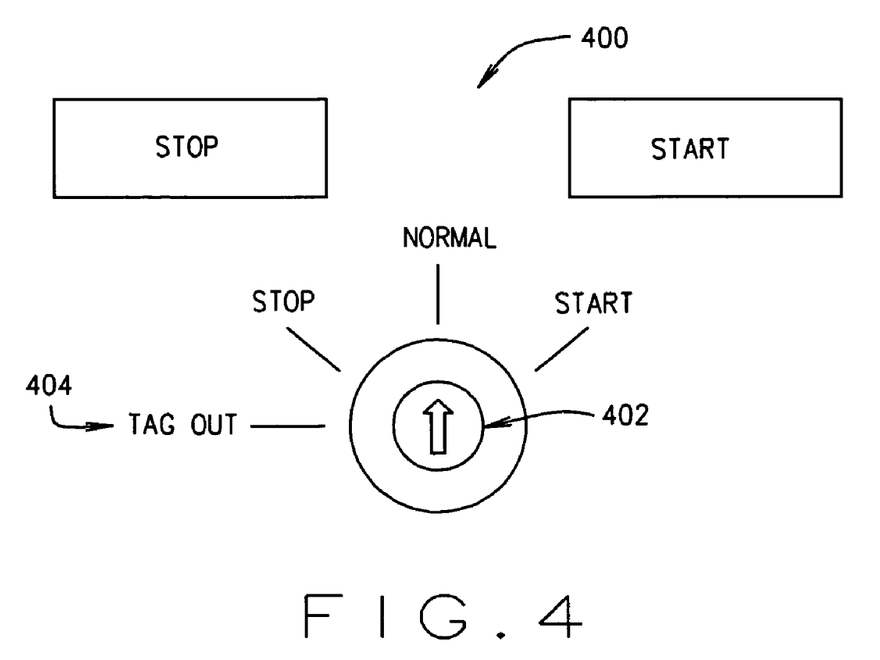
FIG. 4 is a diagram illustrating another control panel switch of an embodiment of a SLC logic unit.

If SLC software 38 detects a critical fault during any mode of operation, the mode changes automatically to INOP mode, irrelevant to the positions of any user selectable switches on SLC logic unit 10 or the MCRP. Critical faults can be detected during execution of background self tests. Some critical fault messages include BAD RAM, BAD EPROM, BAD CPLD, BAD CPU, POWER UP FAULT, and CRITICAL ATWS FAILURE. Once changing to INOP mode, SLC software 38 halts any progression of the injection process that may be active. Besides detected faults, the following conditions also cause the SLC instrument to become "Automatically Out Of Service";

Pump Trip Coil Not OK
Pump Tripping Power Not Available
Pump Closing Power Not Available
Injection Valve (MBV-0005) Control Power Not Available
Storage Tank Outlet Valve (MBV-0001) Control Power Not Available Shown in FIG. 4 is MCRP pump control 400. Manual INOP can be selected at the MCRP by selecting 'Tagout' position 404 from the pump control key switch 402. Likewise a 'Tagout" of the Injection Valve (MBV-0005) or the Storage Tank Outlet Valve (MBV-0001) causes a 'Manual Out of Service' signal, the signal causing the Logic Processor to become inoperative.

The TEST mode is entered by the operator selecting TEST at the MCRP or the Local LSWG Panel, or by switching the SLC instrument to INOP/SELF-TEST mode from the front panel of the SLC Logic Unit 10 (actuated by a key switch located on the front panel display 12). Communication tests on the communication links are run while in INOP/SELF-TEST mode.

Figure 5:
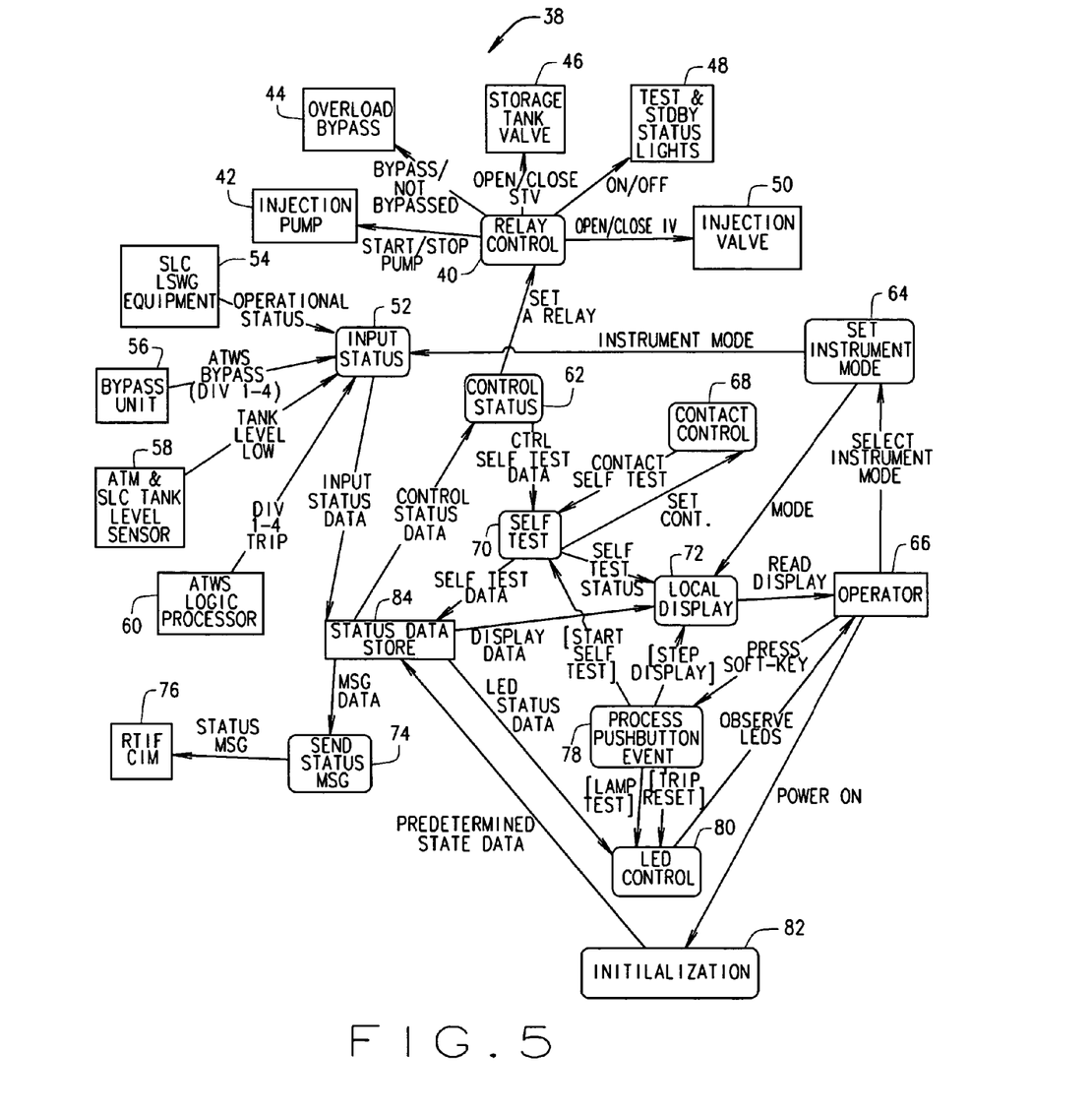
FIG. 5 is a data flow diagram exemplifying an embodiment of SLC software of the SLC logic unit.

FIG. 5 is a data flow diagram exemplifying an embodiment of SLC software 38 of SLC logic unit 10. In FIG. 5, square boxes, e.g. injection pump 42, represent external entities to SLC software 38. SLC software 38 is divided into generic software groupings as shown by a plurality of rectangular boxes with rounded corners, e.g. relay control 40. One rectangle box status data store 84 is unlike the others, and represents internal data store for SLC software 38. The box-like entities of FIG. 5 are interconnected by data flow arrows. External data flow out from and into SLC software 38 is depicted by arrows connecting to or from square box entities. Data flow within SLC software 38 itself is shown by interconnecting arrows between the generic software groupings, e.g. the arrow connecting control status 62 with relay control 40, the arrow identified as 'set a relay'. The following describes the data flow and operation of the software groupings of SLC software 38.

Operator 66 powers on the SLC instrument and initialization 82 stores pre-determined initialization state data to status data store 84, some of this data being sent to relay control 40 via control status 62. Initialization 82 initializes the hardware of SLC logic unit 10 by initializing hardware registers to predetermined values and by running tests on the hardware.

Relay control 40 receives relay status data, e.g. 'set a relay' data, from control status 62, and sets the relays for external equipment, e.g. injection pump 42, overload bypass 44, storage tank valve 46, injection valve 50, and sets the TEST and STDBY lamps of MCRP and front panel display 12 as depicted by TEST & STDBY status lights 48 of FIG. 5. Relay card 14, contact input card 18, and front panel display 12 contained in SLC logic unit 10 are controlled via drivers contained in SLC software 38. Relay control 40, LED control 80, local display 72, input status 52 and contact control 68 exemplify areas of data flow requiring custom I/O drivers.

Control status 62 receives control status data from status data store 84, processes it, and sends relay set data to relay control 40. Control status 62 also sends control self test data to self test 70.

Contact control 68 receives set contact data from self test 70 and returns contact self test data to self test 70. Contact control 68 isolates contacts for self testing.

Self test 70 receives control self test data from control status 62, contact self test data from contact control 68, and/or self test start signal from process pushbutton event 78, executes self tests, and sends resulting self test data to status data store 84 as well as self test status data to local display 72. Background self tests include EPROM self test, RAM self test, power supply self test, CPLD self test, CPU self test, display self test, NVRAM (non-volatile RAM) self test, A/D self test, and frequency detector self test. The SLC software 38 contains drivers and testing algorithms that allow individual or a combination of the frequency detectors to be tested in all modes used (½ MHz mode and a 1 MHz mode in one exemplified embodiment). The SLC software 38 engages (on or off) each of the eight frequency detectors and supplies them with the desired frequency (½ MHz and 1 MHz in one embodiment). Additional tests configured to run in the off-line INOP mode are relay card self test, communications self test, contact card self test, and watch dog self test.

Relay card self tests are performed when in the INOP mode and testing isolates the relays so that no injection of boron occurs during the testing. Contact card self tests are performed when in the INOP mode and testing isolates the input contacts when setting and reading back values for the contacts. Each CPLD has specific deterministic outputs based upon the inputs. SLC software 38 repeats the CPLD logic to validate that the hardware is operating correctly. Any difference in the results between the two is flagged as a CPLD error. Each frequency detector is tested with a fault identifying the frequency detector and which aspect of the test failed as described above.

Set instrument mode 64 receives mode data from operator 66 and sends this data to input status 52 and local display 72. Local display 72 receives display data from set instrument mode 64, self test 70, process pushbutton event 78, and status data store 84 for updating and changing the display on front panel display 12.

Process pushbutton event 78 receives data signals, e.g. pressed soft keys data, from operator 66 and sends data (depending on the signal received from operator 66) to local display 72, LED control 80, and self test 70.

LED control 80 receives data signals, e.g. trip reset and lamp test, from process pushbutton event 78 and updates LED status data into status data store 84 for updating front panel display 12 via local display 72.

Input status 52 collects external data inputs, e.g. operational status of SLC low voltage switch gear (LSWG) equipment 54, ATWS bypass data from bypass unit 56, tank level low status from ATM & SLC tank level sensors 58, and trip data from ATWS logic processors 60. Input status 52 stores input status data into status data store 84.

The input trip data from ATWS logic processors 60 is used as input to SLC injection logic 36 of CPLD 24 of FIG. 1. CPLD 24 uses discrete logic, e.g. 'and' and 'or' gates along with timers to initiate a half trip alarm condition (if determined by the discrete logic). SLC software 38 periodically polls the hardware status, e.g. status/results registers 32 of CPLD 24 of FIG. 1, and upon realizing a half trip alarm condition, executes software-implemented SLC injection logic 36 to validate the hardware status results. If SLC software 38 concurs with the half trip alarm condition of CPLD 24, SLC software 38 then initiates the other half of the trip alarm for a full trip alarm that is stored in status data store 84. Control status 62 begins the injection process upon receiving concurrence of results (from execution of hardware-implemented SLC injection logic 36 in CPLD 24 and execution of software-implemented SLC injection logic 36 in EPROM memory 26) as indicated by retrieving a full trip alarm status from status data store 84.

SLC software 38 changes to INJECT mode based upon inputs. Injection is initiated manually by the operator selecting an MCRP pump start, or automatically by receiving two or more ATWS trip signals. An injection is aborted by the operator selecting an MCRP pump stop, or by making any part of the signal inoperable, e.g. a pump tagout, a system critical self test fault, or by switching SLC software 38 to INOP from the MCRP. Once the tank level as signaled by ATMs falls below an ATM set trip point, the injection pump is stopped, the injection is complete, and SLC software 38 is returned to STANDBY mode. Self tests are run to isolate ATM inputs as well as ATWS inputs in order to test correct functioning of the injection process. Two ATM sensor inputs are supplied. The two inputs are averaged by hardware and fed back to a third ATM, all three ATM signals for tank level sensors are acquired to the data store 84, via input status 52. The SLC software 38 averages the two raw ATM inputs and compares them to the hardware averaged ATM input for self testing. Relays are isolated and controlled during this testing to prevent the actual injection of boron.

The injection pump and injection process are started manually or stopped manually by the operator at the MCRP. A key-switch at the front panel display 12 allows the pump to be started or stopped while SLC logic unit 10 is in TEST mode. An injection is not initiated or stopped from front panel display 12.

All trips and alarms are initiated primarily by a status change of inputs as received at input status 52 and process pushbutton event 78, for example from the LSWG inputs, ATM or ATWS inputs. In one exemplary embodiment of SLC software 38, all inputs are scanned by an executive loop component of SLC software 38. When an input status changes, the executive loop updates the state machine state data store which in turn means that trips or alarms are updated for processing by control status 62.

Send status message 74 obtains message data from status data store 84 and sends status messages to external communication interface module (CIM) 76 for communication to the operator at the MCRP.

Figure 6:
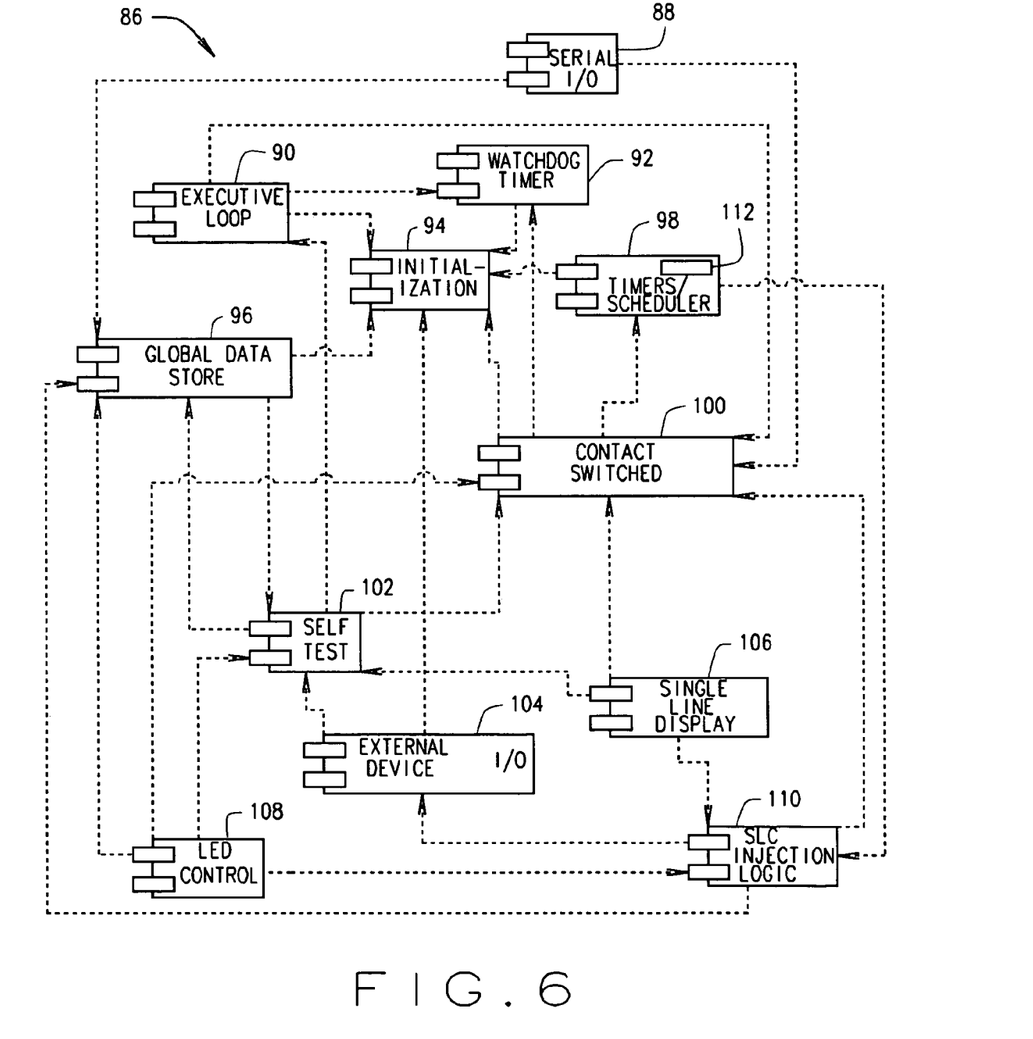
FIG. 6 is a block diagram exemplifying an embodiment of SLC software component architecture for the SLC software of the SLC logic unit.

The flow of execution control for SLC software 38 of FIG. 5 may further be described by the use of FIG. 6.

FIG. 6 is a block diagram exemplifying an embodiment of SLC software packaging or component architecture. SLC software component architecture 86 shows an example of a high level packaging structure of SLC software 38. FIG. 6 provides more of an operating systems implementation point of view. The architecture components are interconnected via the dependency arrows among architecture components. Dependencies are shown via the dotted lines with arrows, such as a component 'A' at the tail of the arrow "depends on" a component 'B' at the arrow head.

As an example embodiment, SLC software 38 uses a micro-operating system that includes a system clock 112, timers/scheduler 98, and function manager context switcher 100. All normal functions are implemented through an executive loop 90 that, with the use of system clock 112, timers/scheduler 98, and context switcher 100, changes the software machine from one state to another. The SLC system uses a context switcher 100 and a timers/scheduler 98 to assure that the system can perform the main function, which is repetition and concurrence of the basic SLC injection logic 110 for the purpose of injecting boron into the reactor. All other functions are performed to assure that the system remains in a ready state and can perform the function for which the system was designed.

Initialization 94 provides for hardware and software initialization. Architecture components that depend on initialization 94 are watchdog timer 92, global data store 96, timers/scheduler 98, context switcher 100, external device I/O 104, and executive loop 90. Initialization component 94 executes upon power up (cold boot) or upon watchdog timer 92 timeout (warm boot) or upon an attempt to execute an illegal address (warm boot). Initialization 94 sets initial values for hardware, e.g. hardware registers, and software, e.g. global data store 96, and runs tests on the hardware.

Once the system is initialized, execution control is given to executive loop 90 which runs simple round robin execution of components that depend upon it. When executive loop 90 finds no events scheduled to run (foreground work), executive loop 90 executes a function, typically a background self test of self test 102, and checks the state machine to determine whether the state machine has changed. Changes in the state machine cause the scheduling of tasks to be run by executive loop 90. In one embodiment, watchdog timer 92 times out and interrupts executive loop 90 to cause another system initialization. System clock 112 resets watchdog timer 92. The system clock 112 is instrumental to scheduling all events and context switching of the SLC software 38 and the watchdog timer 92 assures that the system clock is operating correctly. The system clock 112 assurs the correct operation of the SLC software 38, and the watchdog timer assures correct operation indirectly. Self test 102 depends on executive loop 90. Self test 102 includes different types of functions, which are called and run by executive loop 90 depending on the current system mode. Executive loop 90 depends on context switcher 100 to return control to executive loop 90 once an interrupt or scheduled event has been handled by context switcher 100.

State machine events, such as mode changes, input signal changes, and self test faults, are detected from executive loop 90. When detecting a mode change, an input signal change, and/or a self test fault, executive loop 90 invokes a state machine event handler function (not shown in FIG. 6, but part of the context switcher 100) to process the detected condition. Appropriate actions for the detected condition include updating global data store 96 and, depending on the change to the state machine, scheduling other events via timers/scheduler 98.

Serial I/O 88 generates and sends SLC status messages via communications links to the MCR. Serial I/O 88 depends on global data store 96 to construct a valid message. A timer is scheduled to expire every ½ second to cause serial I/O 88 to be scheduled and invoked to send messages.

Timers/scheduler 98 depends on initialization 94 and on SLC injection logic 110. Context switcher 100 depends on timer/scheduler 98 to signal scheduled events that need to be processed. Timer/scheduler 98 has a system clock 112, which tracks overall time in 'ticks'. Timer/scheduler 98 functions to allow events to be scheduled and deleted. Scheduled events are time critical events, and are prioritized by criticality. An example prioritization is: function time out, state machine input status change, mode change, self test fault, ATWS mitigation initiation present for ½ second, ATWS mitigation initiation override (abort) present for ½ second, toggle flashing lamps/LEDs every ½ second, injection complete ½ second signal delay, send message every ½ second to MCR, etc. In one embodiment, an event is scheduled directly by a function or by context switcher 100. In most cases, the events to be scheduled are timing events. Each event's wait time is predetermined and set by initialization 94 to prevent certain low priority tasks from monopolizing microprocessor 34.

Watchdog timer 92 depends on initialization 94 to initiate watchdog timer 92, depends on executive loop 90 to reset watchdog timer 92 upon completion of a specified function, and depends on context switcher 100 to reset watchdog timer 92 upon completion of a function (if not returning control to executive loop 90). Single line display 106 depends on context switcher 100, self test 102, and SLC injection logic to send messages to single line display 106 for displaying. Single line display 106 also depends on context switcher 100 to signal a step display message to scroll through multiple lines of information.

LED control 108 depends upon self test 102, global data store 96, SLC injection logic 110 (e.g. to send a message that a valve is open or closed or that a pump has started or stopped), and context switcher 100. LED control 108 controls SLC front panel display 12, with the exception of self test LEDs and mapping functions that map the status of the state machine to an LED data store.

External device I/O 104 is the control interface to all external entities, e.g. the square boxes depicted in FIG. 5, with the exception of serial I/O 88 and LED control 108. External device I/O 104 handles control of all relays, contacts, and NVRAM in the SLC hardware. External device I/O 104 depends on self test 102 and initialization 94. SLC injection logic 110 depends on external device I/O 104 to open or close a relay or contact.

SLC injection logic 110 is the software-implementation of SLC injection logic 36, the hardware-implementation being the control logic of CPLD 24. When the SLC is operating correctly, SLC injection logic 110 concurs with CPLD hardware results (that the hardware has performed correctly), concurrence including timing requirements and events to be scheduled. If not concurring, a CPLD fault is signaled, and the mode is changed to INOP mode. SLC injection logic permits valves to open and close, pumps to start and stop, and state machine inputs to be read and updated (state machine mode, e.g. INJECT, is changed only upon concurrence between both the software and hardware). SLC injection logic 110 depends on context switcher 100 to notify SLC injection logic 110 to initiate the injection sequence and logic, and to give notification that key events have occurred at specified times. SLC injection logic 110 depends on global data store 96 to supply global variables that may not be available at context switch time. SLC injection logic 110 depends on external device I/O 104 to open or close a relay or contact. Components that depend on SLC injection logic 110 are single line display 106, and timers/scheduler 98 as already described.

SLC global data store 96 supplies SLC library routines used by other software and provide global data that is available across context switches. The dependencies upon and for SLC global data store 96 have already been discussed.

Self test 102 depends on executive loop 90 in NORMAL, PRE-OP or BYPASS TEST mode, wherein executive loop 90 schedules self test 102 functions. Self test 102 depends on context switcher 100 to cause invocation of the self test 102 functions in all modes. If in INOP/SELF TEST, self test 102 functions are invoked through a user selectable softkey at the SLC front panel 12, otherwise all background functions are scheduled to run when the Executive Loop 90 is not busy. Context switcher 100 is an event handler and when events occur, execution control is passed to context switcher 100, which handles the event, such as running self test 102 functions. Context switcher 100 handles both scheduled and interrupt based events. All background self test 102 functions are suspended when in INOP/SELF TEST mode. The operator selects the self test pushbutton to generate an interrupt (either directly or by schedule), an event that is caught and processed by context switcher 100, which then calls self test 102 functions. Components that depend on self test 102 are led control 108, external device I/O 104, single line display 102, and global data store 96. Components that self test 102 depends upon are global data store 96, executive loop 90, and context switcher 100.

Self test 102 tests that run as background self tests when operating in any mode except INOP/SELF TEST mode are EPROM self test, RAM self test, power supply self test, CPLD self test, CPU self test, display self test, NVRAM self test, A/D self test, ATM Sensor test and frequency detector self test. Additional self test 102 tests that run when operating in INOP mode are relay card self test, communications self test, contact card self test, and watch dog self test and, single line display test.

Context switcher 100 catches and processes pushbutton events and state machine events. Context switcher 100 either performs an immediate context switch and services the event (depending on what the event is), or adds the event to the scheduler 98 to be handled as soon as the current function is done executing. Without context switching, the software machine simply polls the input status and performs state-machine updates in an endless loop by executive loop 90. Event handlers are responsible for the context switching and there are event handlers for each of the generic categories of pushbutton events (pushbutton events can be both interrupts or scheduled events depending on the made and state of the machine), state machine events, and timer events. Timer events and timer event schedule updating of the event control block (ECB) are handled directly by system clock 112, which is part of timers/scheduler 98. Timer event context switching is handled from the executive loop 90. Context switcher 100 depends on a pushbutton event handler (not shown in FIG. 6), depends on timers/scheduler 98 which indicate that a timer has expired and a scheduled event needs to be handled, depends on initialization 94, and depends on watchdog 92. Components that depend on context switcher 100 are LED control 108, self test 102, single line display 106, SLC injection logic 110, serial 110 88, and executive loop 90.

As used herein, the term "computer" includes any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for a nuclear reactor safety related application, said method comprising:
   performing a first test of an application using application-specific logic implemented as hardware logic;
   performing a second test of the application using application-specific logic implemented as software for execution by microprocessor-based controlling software, each test executed with a same set of inputs;
   comparing a first test result produced from the execution of the hardware-implemented form of application-specific logic to a second test result produced from the execution of the software-implemented form of application-specific logic;
   when the compared results concur, performing actions associated with the concurring results by executing microprocessor-based software, such actions comprising:
      actuating external equipment that operate valves when the nuclear reactor is online or offline; and
      performing subsequent equipment and software tests; and
   when the compared results fail to concur, reporting the failure of the compared results to concur to an operator by executing microprocessor-based software, and thereafter placing the microprocessor-based software into an inoperative (INOP) mode.

2. A method in accordance with claim 1 wherein the same application-specific logic is a nuclear reactor standby liquid control (SLC) application, said method further comprising controlling injection of a liquid into the reactor by the SLC application.

3. A method in accordance with claim 1 wherein the hardware-implemented form of application-specific logic is the control logic of at least one programmable logic device (PLD), and the result produced from the execution of the hardware-implemented form of application-specific logic is obtained by microprocessor-based software from reading status registers of the at least one PLD.

4. A method in accordance with claim 1 wherein the software-implemented form of application-specific logic is stored in EPROM memory located on a microprocessor card, the microprocessor card also including at least one microprocessor, RAM memory, non-volatile RAM (NVRAM) memory, and at least one programmable logic device (PLD) wherein the hardware-implemented form of application-specific logic is stored.

5. A method in accordance with claim 1 wherein the same set of inputs includes input signals from sensors and equipment external to operational hardware and software that provide for the execution of the application-specific logic.

6. A method in accordance with claim 5 wherein the input signals from sensors and equipment include nuclear reactor related signals in the form of anticipated transient without SCRAM (ATWS) input signals, analog trip module (ATM) input signals, tank level input signals, bypass unit input signals, and operational status signals from low voltage switch gear (LSWG) equipment.

7. A method in accordance with claim 1 wherein the performing actions associated with the concurring results include performing injection of a liquid into a nuclear reactor by operating relays associated with injection pumps, injection valves, overload bypass, and storage tank valves.

8. A method in accordance with claim 1 wherein the performing actions associated with the concurring results include halting of injection of a liquid into a nuclear reactor by operating relays associated with injection pumps, injection valves, overload bypass, and storage tank valves.

9. A method in accordance with claim 1 wherein, when in the INOP mode, software self tests are executed to test hardware and software associated with the execution of the application-specific logic to detect hardware and software faults, and results of the execution of the self tests are made available to an operator.

10. A method in accordance with claim 9 wherein contacts and relays are isolated during the execution of the software self tests to prevent operation of equipment external to the hardware and software associated with the operation of the application-specific logic.

11. A method in accordance with claim 1 wherein when hardware and software associated with operation of the application-specific logic is in standby operating (STANDBY) mode, as indicated by non-existence of critical faults and concurrence of the compared results, software self tests are executed to test the hardware and software associated with operation of the application-specific logic in order to detect hardware and software faults, and results of the execution of the self tests are made available to an operator.

12. A method in accordance with claim 11 wherein contacts and relays are isolated during the execution of the software self tests to prevent operation of equipment external to the hardware and software associated with operation of the application-specific logic.

13. A method in accordance with claim 11 wherein when critical faults are detected via the execution of the software self tests, the software-implemented form of application-specific logic and the microprocessor-based software are placed into the inoperative (INOP) mode by executing the microprocessor-based software.

14. A method in accordance with claim 1 wherein systems and equipment external to hardware and software associated with the execution of the application-specific logic are automatically actuated and tested for correct operation by the hardware and software associated with the operation of the application-specific logic, with results of the testing being made available to an operator.

15. A digital microprocessor-based system for a nuclear reactor safety related application, said system comprising:
   a microprocessor with memory, hardware, circuitry, and software programming that provides for execution of two forms of a same application-specific logic, and provides for performing a first test of an application using application-specific logic implemented as hardware logic and performing a second test of the application using application-specific logic implemented as software, the two tests executed with a same set of inputs;

the same application-specific logic implemented in one of the two forms as hardware logic, and in another of the two forms as software instructions for execution by the microprocessor;

the software programming further providing for comparison of a first test result produced from execution of the one of the two forms as hardware logic to a second test result produced from execution of the another of the two forms as software instructions;

the software programming further providing, when the compared results concur, for the execution of actions associated with the concurring results, such actions comprising:

actuating external equipment that operate valves when the nuclear reactor is online or offline; and performing subsequent equipment and software tests; and when the compared results fail to concur, the software programming further providing for the reporting to an operator of the failure of the compared results to concur, thereafter the software programming further executing to place the microprocessor-based system into an inoperative (INOP) mode.

16. A system in accordance with claim 15 wherein the same application-specific logic is a nuclear reactor standby liquid control (SLC) application, said SLC application providing for control of injection of a liquid into the reactor.

17. A system in accordance with claim 15 wherein the hardware logic is the control logic of at least one programmable logic device (PLD), and the result produced from the execution of the hardware logic is obtained by microprocessor-based software from reading the status registers of the at least one PLD.

18. A system in accordance with claim 15 further comprising a microprocessor card with EPROM memory for storing the software instructions, at least one microprocessor, RAM memory, non-volatile RAM (NVRAM) memory, and with at least one programmable logic device (PLD) wherein the one of the two forms as hardware logic is implemented.

19. A system in accordance with claim 15 wherein the same set of inputs includes input signals from sensors and equipment external to the system, and wherein the software programming further provides software for receiving the external input signals.

20. A system in accordance with claim 15 wherein the execution of actions associated with the concurring results includes operating relays associated with equipment external to the system via software further provided by the software programming.

21. A system in accordance with claim 15 wherein the software programming further includes self tests for detecting faults in the hardware and software of the system and the software programming further provides, in conjunction with the system hardware, ability to isolate contacts and relays associated with equipment external to the system so as to prevent operation of the equipment during execution of the self tests.

* * * * *